US008019728B2

(12) United States Patent
Bachwani et al.

(10) Patent No.: US 8,019,728 B2
(45) Date of Patent: Sep. 13, 2011

(54) DYNAMICALLY QUANTIFYING AND IMPROVING THE RELIABILITY OF DISTRIBUTED DATA STORAGE SYSTEMS

(75) Inventors: Rekha N Bachwani, Piscataway, NJ (US); Leszek R Gryz, Warsaw (PL); Ricardo G Bianchini, Plainsboro, NJ (US); Cezary Dubnicki, Warsaw (PL)

(73) Assignee: NEC Laboratories America, Inc., Princeton, NJ (US)

( * ) Notice: Subject to any disclaimer, the term of this patent is extended or adjusted under 35 U.S.C. 154(b) by 457 days.

(21) Appl. No.: 12/397,371

(22) Filed: Mar. 4, 2009

(65) Prior Publication Data

US 2009/0265360 A1 Oct. 22, 2009

Related U.S. Application Data

(60) Provisional application No. 61/045,718, filed on Apr. 17, 2008.

(51) Int. Cl.
*G06F 17/00* (2006.01)
(52) U.S. Cl. ........................................ 707/658; 707/674
(58) Field of Classification Search .................. 707/674, 707/688
See application file for complete search history.

(56) References Cited

OTHER PUBLICATIONS

R. Bachwani, L. Gryz, R. Bianchini, and C. Dubnicki. Dynamically Quantifying and Improving the Reliability of Distributed Storage Systems. Technical Report DCS-TR-639, Dept. of Computer Science, Rutgers University, Jul. 2008.
M. Baker et al. A Fresh Look at the Reliability of Long-term Digital Storage. In Proceedings of EuroSys, Apr. 2006.
S. Gaonkar et al. Designing Dependable Storage Solutions for Shared Application Environments. In Proceedings of DSN, Jun. 2006.
K. Keeton et al. On the Road to Recovery: Restoring Data After Disasters.In Proceedings of EuroSys, Apr. 2006.
Q. Lian, W. Chen, and Z. Zhang. On the Impact of Replica Placement to the Reliability of Distributed Brick Storage Systems. In Proceedings of ICDCS, Jun. 2005.
JQ. Xin, E. L. Miller, and T. J. E. Schwarz. Evaluation of Distributed Recovery in Large-Scale Storage Systems. In Proceedings of HPDC, Jun. 2004.

*Primary Examiner* — Cheyne Ly
(74) *Attorney, Agent, or Firm* — Joseph Kolodka

(57) ABSTRACT

Data is stored in a distributed data storage system comprising a plurality of disks. When a disk fails, system reliability is restored by executing a set of reconstructions according to a schedule. System reliability is characterized by a dynamic Normalcy Deviation Score. The schedule for executing the set of reconstructions is determined by a minimum intersection policy. A set of reconstructions is received and divided into a set of queues rank-ordered by redundancy level ranging from a lowest redundancy level to a highest redundancy level. For reconstructions in each queue, an intersection matrix is calculated. Diskscores for each disk are calculated. The schedule for the set of reconstructions is based at least in part on the intersection matrices, the Normal Deviation Scores, and the diskscores.

16 Claims, 10 Drawing Sheets

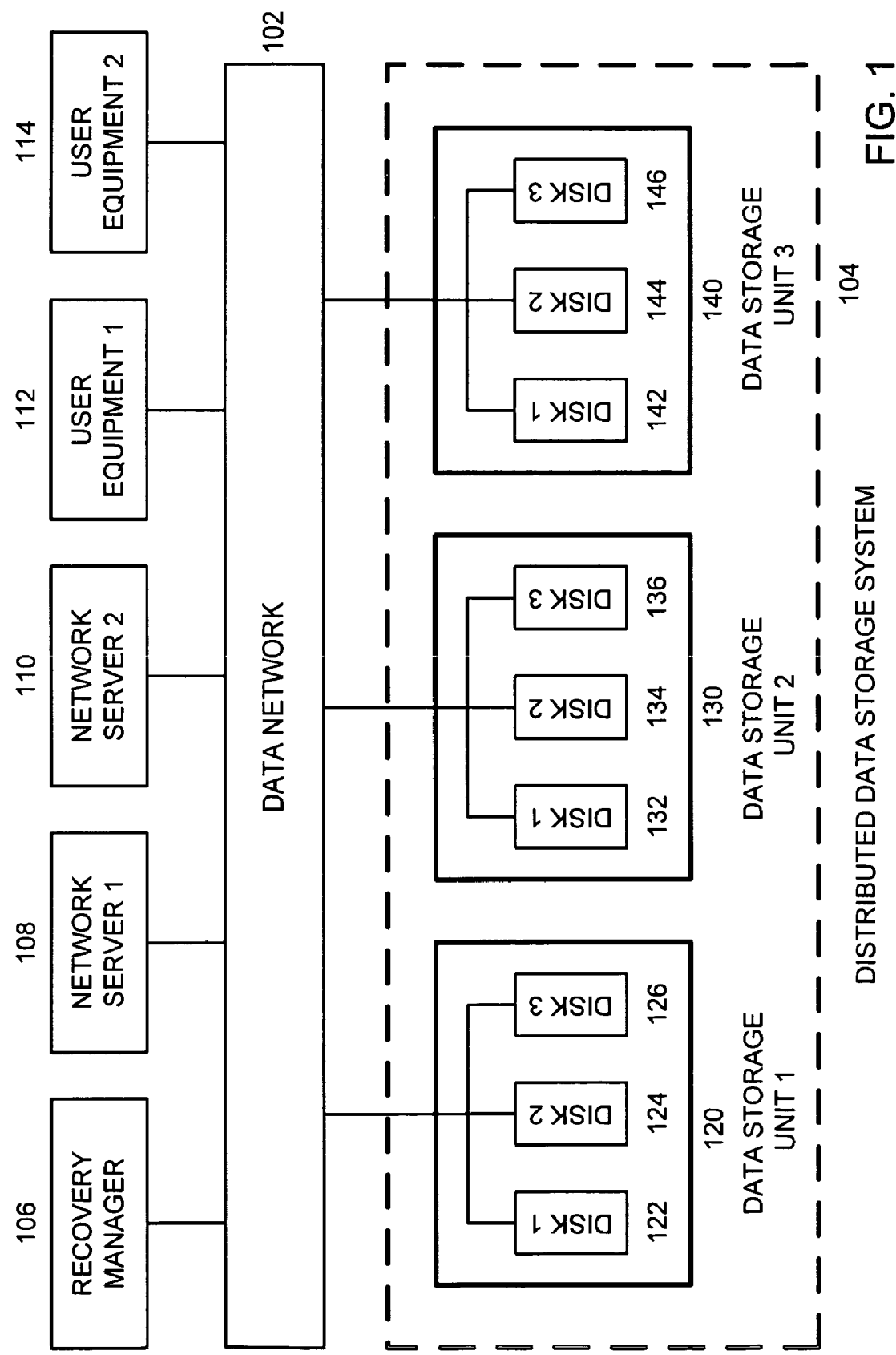

| | D0 | | D1 | | D2 | | D3 |
|---|---|---|---|---|---|---|---|
| | 0:0 | | 1:0 | | 2:0 | | 3:0 |
| | 4:0 | | 5:0 | | 6:0 | | 7:0 |
| | 8:0 | | 9:0 | | 10:0 | | 11:0 |
| | 3:1 | | 0:1 | | 1:1 | | 2:1 |
| | 7:1 | | 4:1 | | 5:1 | | 6:1 |
| | 11:1 | | 8:1 | | 9:1 | | 10:1 |
| | 302 | | 304 | | 306 | | 308 |

(D0 column shown with X overlay; D1 and D3 shown with dashed borders)

FIG. 3A

| D0 | D1 | D2 | D3 |
|---|---|---|---|
| 0:0 | 1:0 | 2:0 | 3:0 |
| 4:0 | 5:0 | 6:0 | 7:0 |
| 8:0 | 9:0 | 10:0 | 11:0 |
| 3:1 | 0:1 | 1:1 | 2:1 |
| 7:1 | 4:1 | 5:1 | 6:1 |
| 11:1 | 8:1 | 9:1 | 10:1 |
| 302 | 304 | 306 | 308 |

| D0 | D1 | D2 | D3 |
|---|---|---|---|
| 0:0 | 1:0 | 2:0 | 3:0 |
| 4:0 | 5:0 | 6:0 | 7:0 |
| 8:0 | 9:0 | 10:0 | 11:0 |
| 3:1 | 0:1 | 1:1 | 2:1 |
| 6:1 | 7:1 | 4:1 | 5:1 |
| 9:1 | 10:1 | 11:1 | 8:1 |
| 402 | 404 | 406 | 408 |

FIG. 4B (top): D0 (402) shown crossed out; D1 (404), D2 (406), D3 (408) shown with dashed borders.

FIG. 4A (bottom): same arrangement with solid borders.

DYNAMICALLY QUANTIFYING AND IMPROVING THE RELIABILITY OF DISTRIBUTED DATA STORAGE SYSTEMS

This application claims the benefit of U.S. Provisional Application No. 61/045,718 filed Apr. 17, 2008, which is incorporated herein by reference.

BACKGROUND OF THE INVENTION

The present invention relates generally to data storage systems, and more particularly to dynamically quantifying and improving the reliability of distributed data storage systems.

Reliable storage of data is a critical operation across a wide spectrum of applications: for example, personnel records, financial transactions, multimedia services, industrial process control, and basic research. Data is stored on physical media, such as semiconductor media (for example, flash memory), optoelectronic media (for example, compact disks and digital video disks), and magnetic media (for example, tape and hard drives). For applications requiring high capacity and fast dynamic read/write speeds, magnetic hard drives are currently the most common data storage device. Capacity and read/write speeds of other media continue to increase, however.

For high-capacity data storage systems, multiple data storage devices may be connected together. For example, multiple hard drives may be connected via a local interface to form a data storage unit. Multiple data storage units may then be connected via a data communications network to form a distributed data storage system. Since each device may fail, distributed data storage systems have multiple points of failure. Redundancy is often used to improve reliability, either by replicating the data blocks, as in RAID-1 or replica-based distributed systems, or by storing additional information, as in RAID-5 or erasure-coded distributed systems. Unless the amount of redundancy in the system is extremely large, when a device fails in a large-scale system, the data stored on it has to be immediately reconstructed on other devices, since device repair or replacement may take a long time, and new failures can occur in the interim. Since high redundancy entails the expense of additional devices, however, improving reliability through failure-management policies instead of additional hardware is desirable.

To improve reliability, a quantitative metric characterizing the reliability of a distributed data storage system first needs to be defined. Existing metrics include Probability of Data Loss (PDL) and Mean Time To Data Loss (MTTDL). PDL is estimated either as the percentage of simulation runs that result in data loss or by using a (typically combinatorial) model of the PDL for the system. Similarly, MTTDL is estimated either as the mean of the time-to-data-loss values over a large number of simulations or by using a (typically Markovian) model of the system reliability. Regardless of how they are computed, however, PDL and MTTDL quantify reliability with a single, static measure, irrespective of time or the current state of the system. Although useful in some applications, these metrics provide only a macroscopic, long-term view of system reliability. They are not capable of assessing reliability at each point in time, as device failures, data reconstructions, and device replacements occur.

What are needed are method and apparatus for dynamically quantifying the reliability of a distributed data storage system and improving the reliability without additional device redundancy.

BRIEF SUMMARY OF THE INVENTION

In an embodiment of the invention, data is stored in a distributed data storage system comprising a plurality of disks. When a disk fails, system reliability is restored by executing a set of reconstructions according to a schedule. A set of reconstructions is received and divided into a set of queues rank-ordered by redundancy level ranging from a lowest redundancy level to a highest redundancy level. A first intersection matrix for reconstructions in the queue having the lowest redundancy level is calculated. A first Normalcy Deviation Score characterizing the system reliability is calculated. A first diskscore for each disk is calculated. Based at least in part on the first intersection matrix, the first Normalcy Deviation Score, and the first diskscores, a first schedule for the received set of reconstructions is generated. The process is iterated for the remaining queues, and a final schedule is generated.

These and other advantages of the invention will be apparent to those of ordinary skill in the art by reference to the following detailed description and the accompanying drawings.

BRIEF DESCRIPTION OF THE DRAWINGS

FIG. 1 shows a high-level schematic of a data communications system;

FIG. 2 shows a redundancy scheme for cluster allocation;

FIG. 3 shows a redundancy scheme for chained declustering allocation;

FIG. 4 shows a redundancy scheme for declustering allocation;

DETAILED DESCRIPTION

Figure 5:
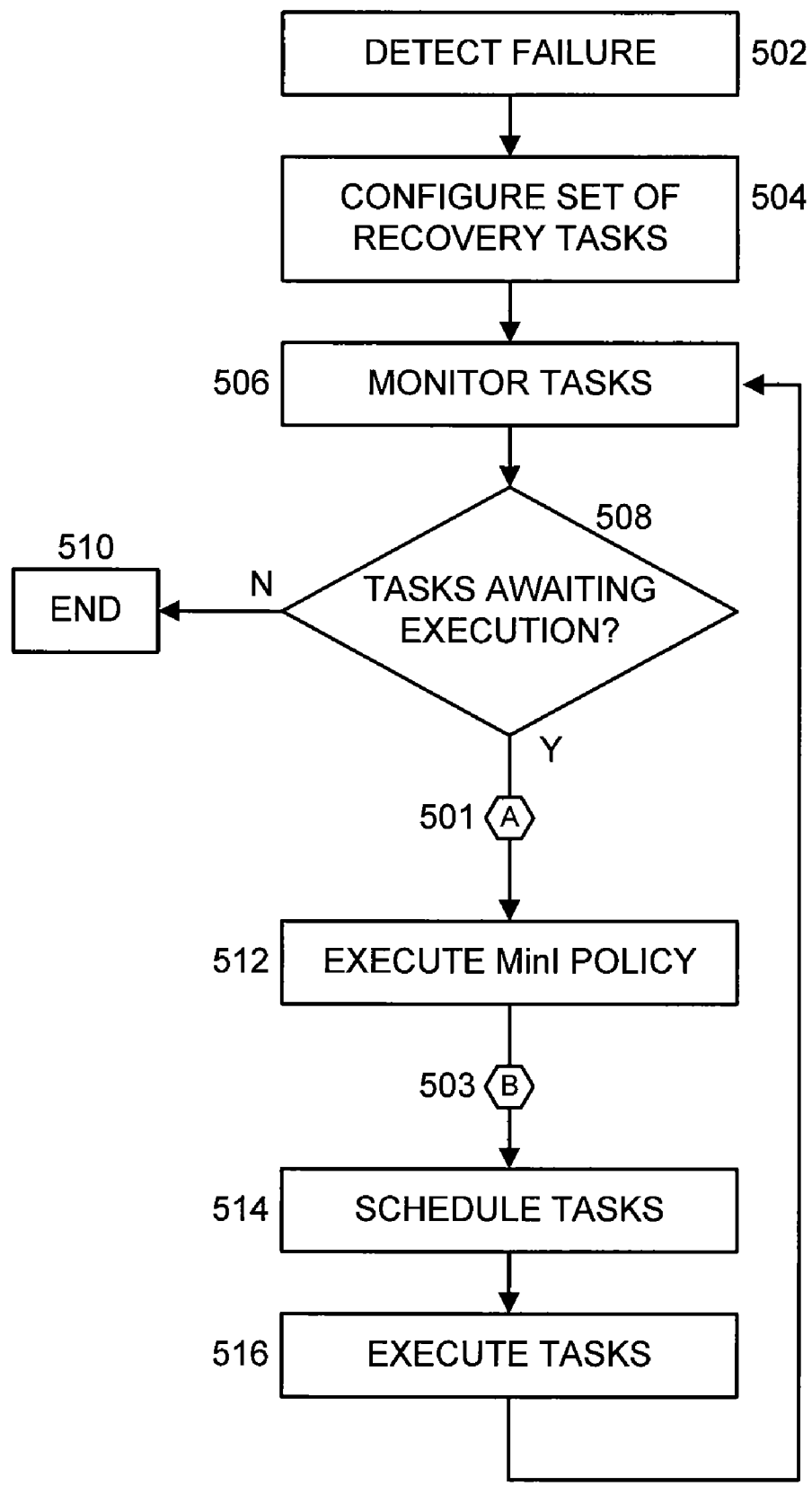
FIG. 5 shows a high-level flowchart of steps for recovery process.

FIG. 1 shows a high-level schematic of a data communications system. Various network elements communicate via data network 102. The number of network elements may be large (thousands or more). Representative network elements include network server 1 108, network server 2 110, user equipment 1 112, and user equipment 2 114. Examples of user equipment include workstations, personal computers, and cell phones. Data is stored on physical data storage devices, such as flash drives, CD drives, DVD drives, and magnetic hard drives. Herein, an individual physical data storage device is referred to as a "disk". Note that a "disk" is not limited to a magnetic hard drive, but refers to any physical data storage device. Multiple disks may be connected to form a data storage unit, such as a bank (assembly) of hard drives. Herein, a data storage unit includes the case of a single disk. Multiple data storage units may be connected via data network 102 to form a distributed data storage system. Herein, a distributed data storage system includes the case of a single data storage unit. Herein, a distributed data storage system comprises a set of disks.

In FIG. 1, distributed data storage system 104 includes three data storage units: data storage unit 1 120, data storage unit 2 130, and data storage unit 3 140. Each data storage unit includes three disks: data storage unit 1 120 includes disk 1 122, disk 2 124, and disk 3 126; data storage unit 2 130 includes disk 1 132, disk 2 134, and disk 3 136; and data storage unit 3 140 includes disk 1 142, disk 2 144, and disk 3 146. In general, the number of disks in a data storage unit may be large; for example, current data storage units contain as many as twelve hard drives. As technology advances, the number continues to grow. The number of data storage units in a distributed data storage system may also be large; for example, hundreds or more.

FIG. 1 shows one representative network architecture for a data communications system. Embodiments of the invention may be adapted for specific network architectures. For example, the number of disks in each data storage unit may vary, and groups of data storage units may be connected via local interfaces or local area networks. Multiple groups may then be connected to form a distributed data storage system. In general, data storage units may be geographically dispersed over multiple sites to provide redundancy in case a particular site loses power or is destroyed. Note that a disk or data storage unit may be a dedicated, stand-alone unit or an integral part of a network element, such as a hard drive in network server 1 108 or user equipment 1 112.

The reliability status of distributed data storage systems changes dynamically, as disks and data storage units fail, their data is reconstructed, and the failed devices are replaced or repaired. Metrics for quantifying the reliability of a system over time fall into two general classes: forward-looking and backward-looking. In forward-looking metrics, the reliability at each point in time is characterized with respect to potential future events that may lead to data loss. Forward-looking dynamic metrics are similar to traditional, static metrics, such as PDL or MTTDL, which rely on the probability of future events. Backward-looking metrics do not depend on potential future events; they represent the actual current state of the system. Current reliability is a function of past events that have reduced the redundancy of the data.

In an embodiment of the invention, system reliability is characterized by a dynamic backward-looking metric referred to herein as Normalcy Deviation Score (NDS). In this formulation, data is organized into data blocks. Herein, data blocks are also referred to as blocks. A block is split into fragments. A subset of fragments is required to reconstruct the block. Herein, a block comprises a set of fragments. See further discussion below. The NDS at time t is calculated according to the algorithm:

$$NDS(t) = \left(\sum_{i=0}^{k-1} b_i(t) \times f^{k-i}\right) \times T_{alloc}, \quad (E1)$$

where:
  k is the level of redundancy of all blocks in the distributed data storage system under normal operation, where normal operation refers to the state of the distributed data storage system in which all disks are operational and all data blocks have all their redundancy intact;
  $b_i$ is the number of blocks that have i levels of redundancy left at time t;
  $T_{alloc}$ is the minimum time to reconstruct a disk; and
  f is a scaling factor chosen by a user (herein, also referred to as the system administrator).

The parameter $T_{alloc}$ depends on the data allocation scheme, as discussed below. One skilled in the art may develop NDS algorithms for data which is organized according to other structures.

The system administrator may choose f to reflect how much more critical the loss of an additional level of redundancy is. For example, for f=10, each level of redundancy lost degrades the system reliability by an additional order of magnitude. The k-value depends on the level of redundancy built into the system. The system redundancy may be represented by the notation (n,m), where each data block is either replicated, striped, or encoded into n fragments, but only m (m≦n) of which are required to read the block. Here, k is equal to n−m. For example, a RAID-1 system can be described as (2,1) with k=1, since each block has a replica but only one of the copies (fragments) is necessary to read the block. If all fragments for a specific data block are present, then the level of redundancy left is k. If one fragment of a specific data block is lost, then the level of redundancy left is k−1. In general, the level of redundancy left for a specific data block is the number of additional fragments that the data block could lose without the data of the block being lost. In an embodiment in which every disk hosts at most one fragment of any data block, the level of redundancy left for a specific data block is the number of disks that can fail before the specific data block is lost. That is, the level of redundancy left is k minus the number of missing fragments.

When one or more fragments are lost, reconstructions are executed to restore system reliability to the reliability under normal operation. Herein, "fragment reconstruction" refers to a process that uses other fragments of that block to recreate (reassemble) a lost fragment. Herein, "block reconstruction" refers to a process that rebuilds missing fragments of a block.

Key advantages of the NDS metric include the following:
(a) It can be efficiently computed dynamically. Information about $b_i$ is readily available, since distributed data storage systems need data-allocation and device failure information for proper operation. Furthermore, the exponential components can be easily pre-computed, and $T_{alloc}$ is a constant that can also be easily pre-computed.
(b) It is flexible, and parameters may be configured by a user (system administrator) for specific systems. The system administrator may weight the loss in redundancy by setting f appropriately.
(c) Blocks that are close to being lost may be heavily weighted in the metric. NDS weights the losses in redundancy exponentially in factor f and the number of blocks at each redundancy level linearly.
(d) Serious losses in the redundancy of relatively few blocks are not amortized by vast amounts of remaining redundancy in the system. The NDS is not affected by the blocks that have not lost redundancy, since i ranges from 0 to k−1.
(e) The time to reconstruct the data on a disk is also taken into consideration. As disk sizes increase, the time to reconstruct lost redundancy becomes an increasingly significant factor in system reliability. Explicitly including reconstruction time as a parameter also allows for different data allocations under the same failure events to be directly compared. NDS considers the time to reconstruct a disk linearly.

In the embodiment described by (E1), NDS is unit-less. Under normal operation, the value of the metric equals 0. If all blocks lose all of their redundancy (that is, one more failure anywhere in the system will cause data loss), the value becomes $B \times f^k \times T_{alloc}$, where B is the total number of blocks in the system. When data is lost, NDS is defined to be positive infinity. Thus, lower values of the metric are better for system reliability. In another embodiment, the NDS values are normalized with respect to the worst possible score (before data loss), resulting in a range from 0 to 1 for the normalized scores.

NDS allows the comparison of states of the same system or states of different systems that have the same redundancy scheme (that is, same values of n and m) but different data allocation schemes. NDS may also be combined with standard (static) reliability metrics, such as PDL and MTTDL, which can be used to estimate reliability under normal operation.

As mentioned above, $T_{alloc}$ depends on the data allocation scheme. Embodiments of the invention applied to three common data allocation schemes are discussed below. These data allocation schemes are referred to as clustering ($T_{alloc}=T_{clus}$), chained declustering ($T_{alloc}=T_{cdc}$), and declustering ($T_{alloc}=T_{declus}$).

Figures 2A, 2B:
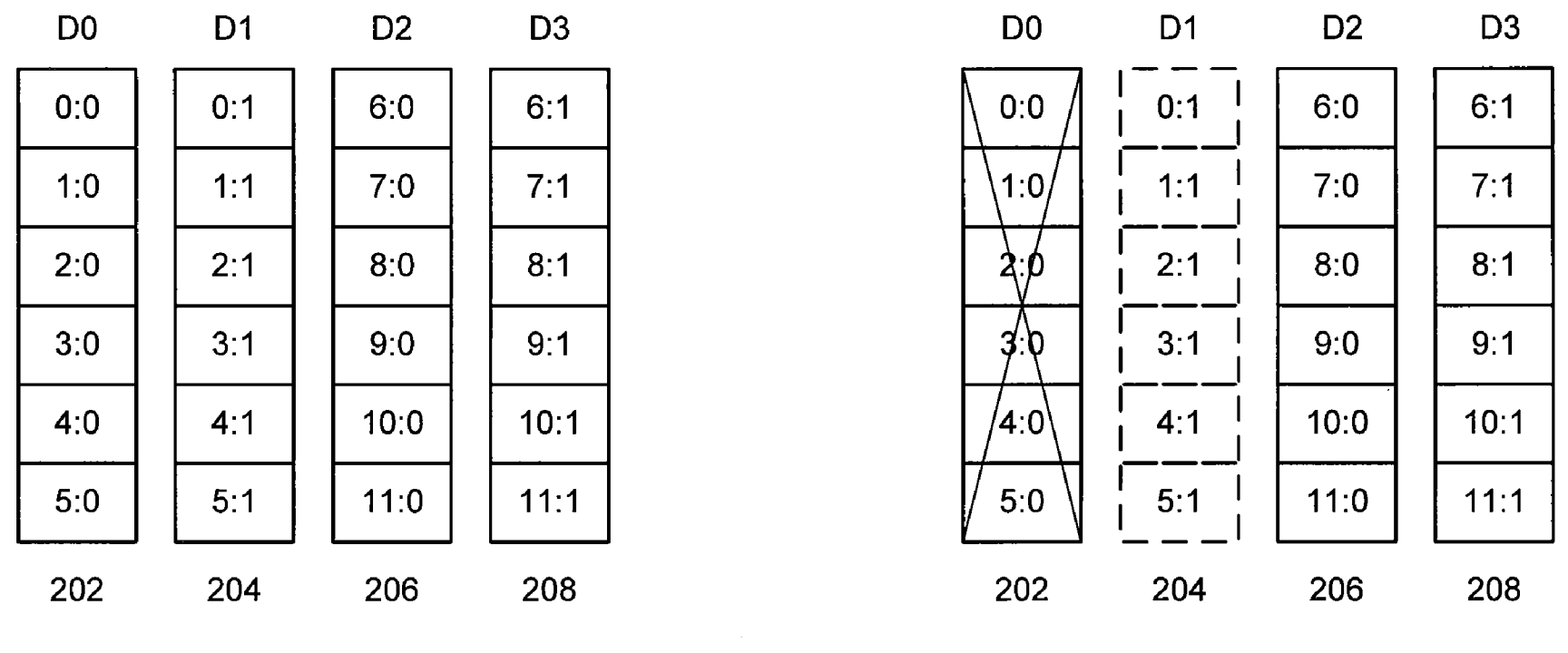

Clustering places the fragments of data blocks such that the number of disks that store fragments of the same blocks is minimized. FIG. 2A shows a (2,1) data storage system with four disks (labelled D0 202-D3 208) and a total of 12 blocks, each of them with two fragments. Only one of the fragments is necessary to read the block. In FIG. 2A, the blocks and fragments are indicated by the index block: fragment; for example, the notation 0:1 indicates block 0 and fragment 1. As shown in FIG. 2A, disks D0 202 and D1 204 store fragments of blocks 0 to 5; whereas, disks D2 206 and D3 208 store fragments of blocks 6 to 11. As shown in FIG. 2B, if disk D0 202 fails, the only data that is left vulnerable to the next failure is that stored on disk D1 204; the only way there could be data loss is if disk D1 204 fails. To reconstruct the fragments that are stored on disk D0 202, however, disk D1 204 is the sole source; that is, it is the only disk in the recovery set of all fragment reconstructions. This causes all reconstructions to contend for recovery bandwidth on disk D1 204.

The optimal schedule (for a constant recovery bandwidth) in this case would be to execute the reconstructions sequentially, rather than in parallel. In general, performing reconstructions with overlapping recovery sets splits the recovery bandwidth of the overlapping disks, thereby slowing all the reconstructions down. Under clustering, the maximum number of reconstructions that can be executed in parallel after a disk failure is $\lfloor (n-1)/m \rfloor$. When the recovery bandwidth is constant, executing this number of reconstructions in parallel produces the minimum reconstruction time. Thus, the minimum time to reconstruct all the data fragments of a failed disk under clustering is: $T_{clus}=d_{size}/(b_r \lfloor (n-1)/m \rfloor)$, where $d_{size}$ is the amount of data stored on the failed disk and $b_r$ is the recovery bandwidth. Note that $T_{clus}$ only considers data reconstructions, disregarding the transfer of those data back to their original disk, after it is replaced or repaired and reintegrated into the system. The reason for this choice is that NDS is concerned with redundancy; reconstructions increase redundancy after a hardware failure, whereas transfers back to original disks do not. Furthermore, note that $T_{clus}$ is the minimum time to reconstruct the data, even when the disk is quickly replaced or repaired. The disk is assumed to be empty when it comes on-line; that is, the entire contents of the disk have to be reconstructed before they can be copied back. $T_{cdc}$ and $T_{declus}$ below are defined in a similar way.

Chained declustering distributes the fragments of each block such that they are stored on logically neighboring disks in a balanced way. For example, FIG. 3A shows the placement of fragments under this redundancy scheme. The data storage system comprises four disks, labelled D0 302-D3 308. If a disk fails, for example disk D0 302 in FIG. 3B, both disks D1 304 and D3 308 can serve as the source for the reconstructions. Two fragments may be reconstructed in parallel, reducing the overall reconstruction time and the time during which data is vulnerable, in comparison to the clustering allocation scheme. The failure of either disk D1 304 or D3 308, however, would lose data, if it failed before the data on disk D0 302 is reconstructed. Given this allocation scheme, the maximum number of reconstructions that can be executed in parallel after a disk failure is $\lfloor 2(n-1)/m \rfloor$. Assuming that the recovery bandwidth is constant, the minimum time it will take to reconstruct the data stored on a failed disk is: $T_{cdc}=d_{size}/(b_r \lfloor 2(n-1)/m \rfloor)$.

Declustering (short for Group Rotated Declustering) distributes fragments of data blocks to minimize the degree of co-location among disks. This leads to a balanced reconstruction load across the active disks in the group. FIG. 4A shows the placement of data fragments for declustering. The data storage system comprises four disks, labelled D0 402-D3 408. As shown in FIG. 4B, if disk D0 402 fails, each of the remaining disks (D1 404-D3 408) may serve as the source for reconstruction of exactly two fragments, allowing up to three reconstructions to take place in parallel. Data will be lost, however, if any other disk fails before the data stored on disk D0 402 can be reconstructed. Among the three allocation schemes, the time to complete disk reconstruction will be the minimum for declustering. Since declustering spreads fragments evenly, the number of reconstructions that can potentially be executed in parallel is $\lfloor (d_g-1)/m \rfloor$, where $d_g$ is the number of disks in each group; that is, the number of disks over which the data of each disk is spread. Again, assuming that the recovery bandwidth is constant, the minimum time it will take to reconstruct the data of a failed disk is: $T_{declus}=d_{size}/(b_r \lfloor (d_g-1)/m \rfloor)$.

In an embodiment of the invention, NDS is used as a metric in a data recovery scheduling policy (algorithm) to rapidly reconstruct the data from failed disks and data storage units to avoid long periods of reduced redundancy in a distributed data storage system. This policy, herein called Minimum Intersection (MinI), selects a recovery set for each fragment reconstruction and orders the set of reconstructions to minimize the overall reconstruction time. Herein, a recovery set refers to a set of source disks and a destination disk. For a specified destination disk, the recovery set also refers to the set of source disks. Herein, a destination disk is also referred to as a target disk. MinI determines when each reconstruction should be performed and which disks should participate in it. Because of redundancy, multiple disks can potentially participate as data sources in each reconstruction. For higher performance, MinI tries to use a different target (destination) disk for each reconstruction. To make its decisions, MinI leverages the NDS metric to tradeoff reliability and performance. For example, in one embodiment, MinI increases the disk bandwidth dedicated to reconstructions up to a predefined limit, if this increase would generate a percentage NDS gain that exceeds the expected percentage loss in performance.

The MinI scheduling algorithm uses a greedy heuristic based on the following principles:

(a) MinI prioritizes reconstructions based on their current redundancy levels. The lower the current amount of redundancy, the higher the priority. Reconstructing the fragments of the most vulnerable data blocks first ensures that the possibility of data loss if additional failures occur is minimized. In addition, reconstructions have higher priority than copy backs; the latter do not increase redundancy, so they are only allowed to proceed when no reconstructions are taking place on the corresponding disks.

(b) MinI selects a recovery set for each reconstruction to maximize parallelism, while avoiding interference. To reconstruct a fragment, any m of the remaining fragments of the same block can be used. MinI leverages this flexible choice of source disks to minimize the intersection among the recovery sets of concurrent reconstructions. It uses a two-dimensional diskscore and a greedy algorithm to choose m disks with the smallest diskscores. Reconstructions that cannot be made completely independent (that is, they must have overlapping recovery sets) are only run concurrently if the gain in reliability, as computed by NDS, would justify the potential loss in regular-access performance.

(c) Increasing the disk bandwidth allotted to recoveries improves overall reliability. Higher recovery bandwidth, however, results in lower bandwidth for actual accesses to the distributed data storage system. Furthermore, increasing the recovery bandwidth of all the disks in the system may be inefficient if only a small set of disks are the bottleneck in the recovery process. MinI dynamically increases the recovery bandwidth for the subset of disks that participate in multiple reconstructions up to a certain pre-established limit. The limit may be specified by a user (system administrator). This approach results in higher system reliability for a small loss in regular-access bandwidth.

MinI takes the set of reconstructions to be performed as input and produces a schedule as output. The schedule contains the reconstructions that should be executed next and the recovery sets that they should use. The input set of reconstructions is determined by the location of existing fragments that can be used to recreate missing fragments of a specific block. To compute the schedule, MinI divides the set of reconstructions into separate queues based on their remaining amounts of redundancy; that is, reconstructions for blocks that have the same number of remaining fragments are grouped together. The queues are rank-ordered by redundancy level, ranging from lowest redundancy level to highest redundancy level. The policy starts by scheduling the reconstructions associated with the non-empty queue that has the least amount of redundancy left. An intersection matrix is computed for these reconstructions, as discussed below. From the intersection matrix, MinI chooses the pair of reconstructions that have sets of potential disk sources with the smallest intersection. If there are multiple pairs with the smallest intersection, a random pair in this set is selected. Other embodiments of the invention may use a more sophisticated tie-breaking approach that minimizes future intersections within the same redundancy level.

After that, MinI selects recovery sets for the chosen reconstruction using a two-dimensional diskscore, as described below. If the chosen reconstructions have overlapping recovery sets, MinI adds them to the schedule depending on a tradeoff between reliability and performance. The actual tradeoff function can be specified by the user, as described below. The policy then iterates through the remaining reconstructions in the current redundancy-level queue, chooses the reconstruction that has the smallest intersection with the reconstructions already in the schedule (again looking at the intersection matrix for this redundancy level), assigns recovery sets, and trades off reliability and performance, as mentioned above. It repeats the above process for the reconstructions in the other redundancy-level queues, in increasing order of redundancy left. For each other redundancy level, intersections are computed with respect to those reconstructions from previous queues that appear in the schedule and the reconstructions in the current queue. Information about the latter intersections appears in the current intersection matrix.

For each redundancy level, no additional reconstructions have to be considered after the first is rejected for inclusion in the schedule. The policy halts when reconstructions across all the redundancy-level queues have been considered once for inclusion in the schedule. Any reconstructions that were not included in the schedule will be considered again after the current schedule is performed.

An intersection matrix is computed for each redundancy level queue. Each element of the matrix contains the size of the pairwise intersection of the potential source sets of the reconstructions in that queue. The i-th row contains the size of the intersection of the source set of the i-th reconstruction with all the remaining reconstructions in that queue. Thus, each intersection matrix is symmetric; that is, the intersection (i,j) is the same as (j; i).

The diskscore is a two-dimensional score computed for all the disks in the system. The diskscore comprises a static score and a dynamic score. The static score of a disk indicates the number of reconstructions in which it could participate as a source or destination. The dynamic score of a disk indicates the number of scheduled reconstructions whose recovery set it belongs to either as a source or destination. Initially, all disks are assigned a diskscore of 0:0. The first number indicates the static score and the second the dynamic score. MinI iterates through the reconstructions and, for each disk that is a potential source for some reconstruction, it increments the static score of the disk. The dynamic score is updated when MinI adds reconstructions to the current schedule. Comparing the diskscores of two disks involves first comparing their dynamic scores and, only if there is a tie, comparing their static scores later.

MinI uses the diskscore of the disks in the potential source set to choose m disks with the smallest diskscores. If the destination disk is not chosen already (it may have been chosen if the same reconstruction had been started before but interrupted by another event in the system), the disk with the smallest diskscore among the other available disks is chosen, and its dynamic score is also incremented.

MinI leverages NDS to tradeoff reliability and performance: it only schedules two non-independent reconstructions in parallel if doing so would improve NDS enough compared to the potential loss in performance. The reason for a potential performance loss is that MinI assigns recovery bandwidth to each reconstruction running concurrently on a disk (up to a user-specified limit discussed below) as if it were running alone on the disk. This means that reconstructions with overlapping recovery sets take away bandwidth that could be used for regular storage accesses. Thus, when trading off performance and reliability, the change in performance is represented by the percentage loss in regular-access bandwidth. Herein, the percentage loss in regular-access bandwidth is represented by the variable loss. The gain in NDS is computed as the percentage difference between the NDS value before the reconstruction and the predicted NDS value after the reconstruction. Herein, the gain in NDS is represented by the variable gain.

When the recovery set of a reconstruction overlaps with the recovery sets of other reconstructions already on the schedule, MinI compares the sum of the NDS gain of each of the reconstructions on the schedule and the additional performance loss that the system would incur if the recovery bandwidth of the overlapping disks were increased. One skilled in the art may specify various comparison functions for embodiments of the invention. Herein, a comparison function is also referred to as a tradeoff function and is explicitly a function of gain and loss: tradeoff(gain, loss). In one embodiment of the invention, MinI uses a linear comparison between reliability gain and the potential loss in performance. In other words, if the percentage gain in reliability is higher than the percentage loss in performance, the reconstruction is added to the schedule. Finally, there is a user-defined limit on the maximum acceptable performance loss resulting from additional disk bandwidth assigned to reconstructions. MinI jumps to the next redundancy-level queue, if either the gain in reliability is relatively small compared to the loss in performance, or it reaches the performance-loss limit.

FIG. 5 shows a high-level schematic of an embodiment of the overall recovery process. In step 502, a failure of a disk or data storage unit is detected. The process then passes to step 504, in which a set of recovery tasks (set of reconstructions) is configured. The tasks are monitored in step 506. In step 508 a status check is performed. If no tasks are awaiting execution, then the process passes to step 510, and the process ends; that is the failure has been recovered. If there are tasks awaiting to be executed, then the processes passes to step 512, in which the MinI policy is executed. Further details of step 512 are given below. The output of step 512 is a set of tasks, which are scheduled in step 514 and executed in step 516. The process then loops back to step 506, and step 506-step 516 are iterated.

Figure 6A:
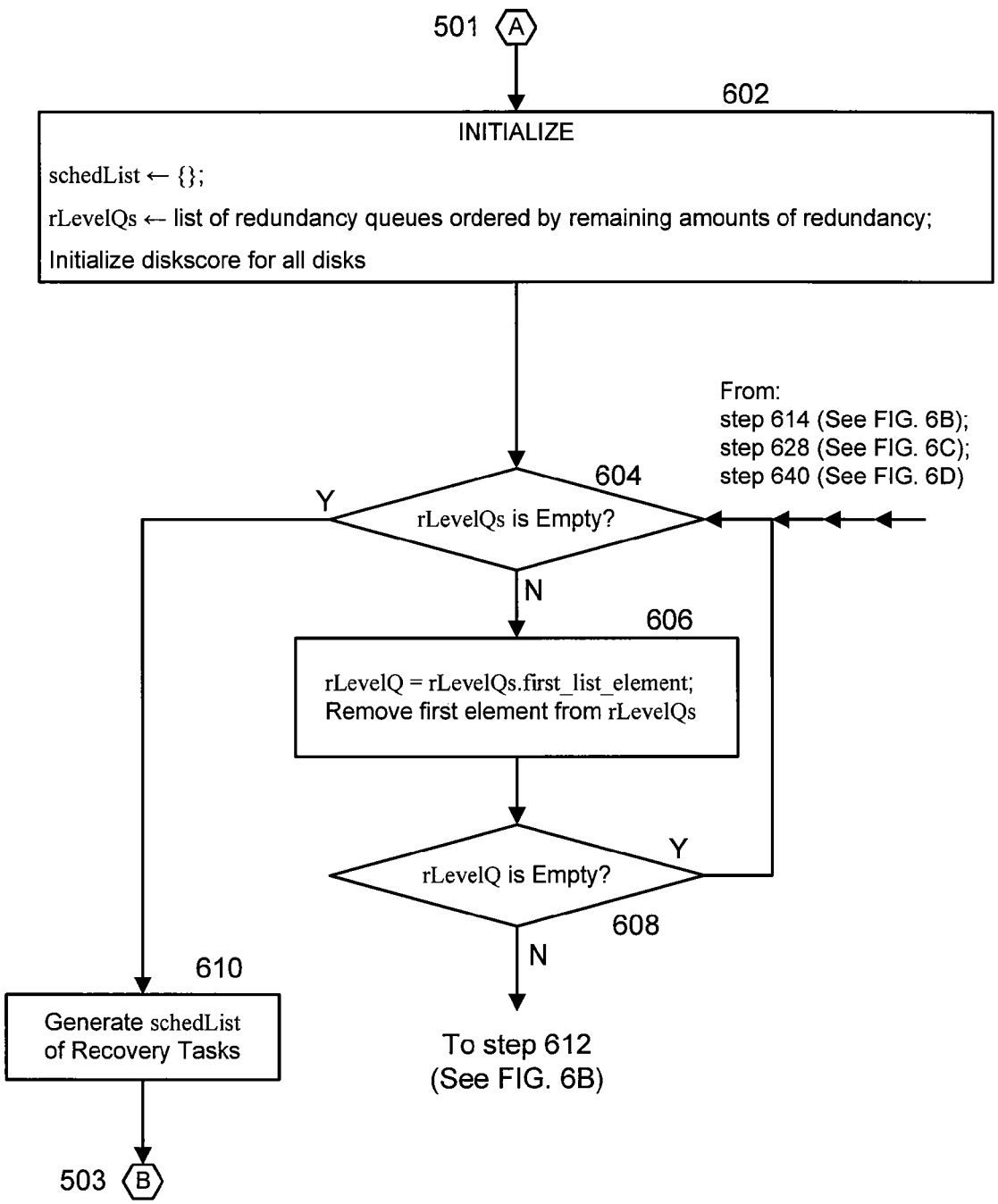
FIG. 6A-FIG. 6D show a high-level flowchart of steps for MinI policy.

Details of the MinI policy (step 512) are given in FIG. 6A-FIG. 6D. The input and output of step 512 are indicated by reference index A 501 and reference index B 503, respectively. Refer to FIG. 6A. In step 602, parameters in the algorithm are initialized. A list of tasks to be scheduled and executed, denoted schedList, is initialized to an empty set. The parameter rLevelQs is set to a list of redundancy queues ordered by remaining amounts of redundancy. The diskscores for all disks are initialized.

The process then passes to step 604, in which a status check is performed. If rLevelQs is empty, then the process passes to step 610, in which schedList is returned, and MinI policy exits. If rLevelQs is not empty, then the process passes to step 606. The parameter rLevelQ is defined as the first list element in rLevelQs, denoted rLevelQs.first_list_element. This first list element is then removed from rLevelQs. The process then passes to step 608, in which a status check is performed. If rLevelQ is empty, then the process returns to step 604. If rLevelQ is not empty, then the process passes to step 612 (see FIG. 6B). In step 612, an intersection matrix is created for reconstructions in rLevelQ.

The process then passes to step 614, in which a status check is performed. If rLevelQ is empty, then the process returns to step 604 (FIG. 6A). If rLevelQ is not empty, then the process passes to step 616, in which a status check is performed. If schedList is empty, then the process passes to step 618 (see FIG. 6C). If schedList is not empty, then the process passes to step 630 (see FIG. 6D).

The branch starting with step 618 is first discussed. In step 618 (FIG. 6C), the following processes are performed: (a) From rLevelQ, using the intersection matrix, choose a pair of reconstructions with the smallest intersection. If more than one such pair exists, choose one of the pairs at random. (b) Choose m source disks with the smallest diskscore for each reconstruction. If more than one such set of source disks exists, choose one of the sets at random. (c) Choose another disk with the smallest diskscore as the destination for each reconstruction. If more than one such disk exists, choose one of the disks at random. The process then passes to step 620, in which the following parameters are set: (a) recovery_set_1 is the set of all source disks and the destination disk of the first reconstruction. (b) recovery_set_2 is the set of all source disks and the destination disk of the second reconstruction. (c) intersection is the set of disks that belong to both recovery_set_1 and recovery_set_2.

Figure 6B:
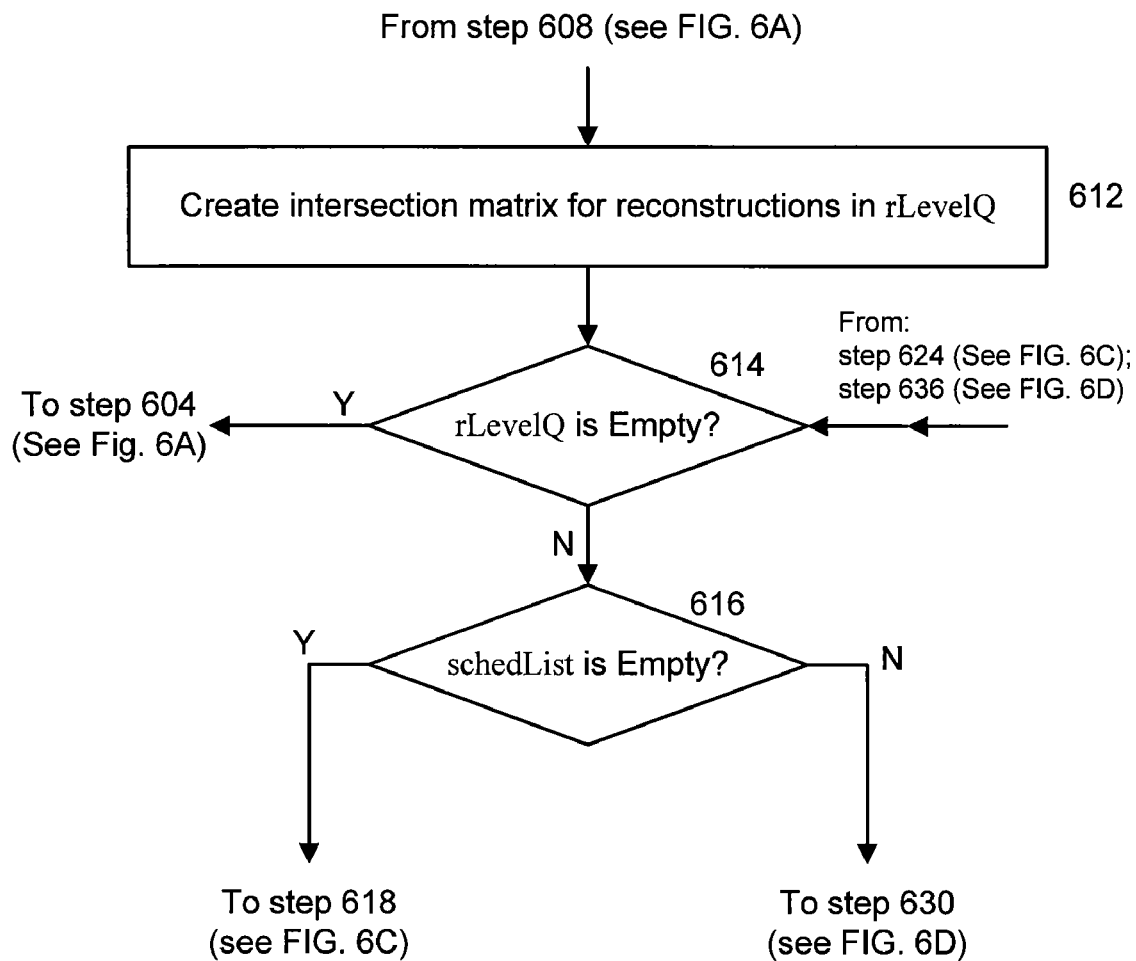
Figure 6C:
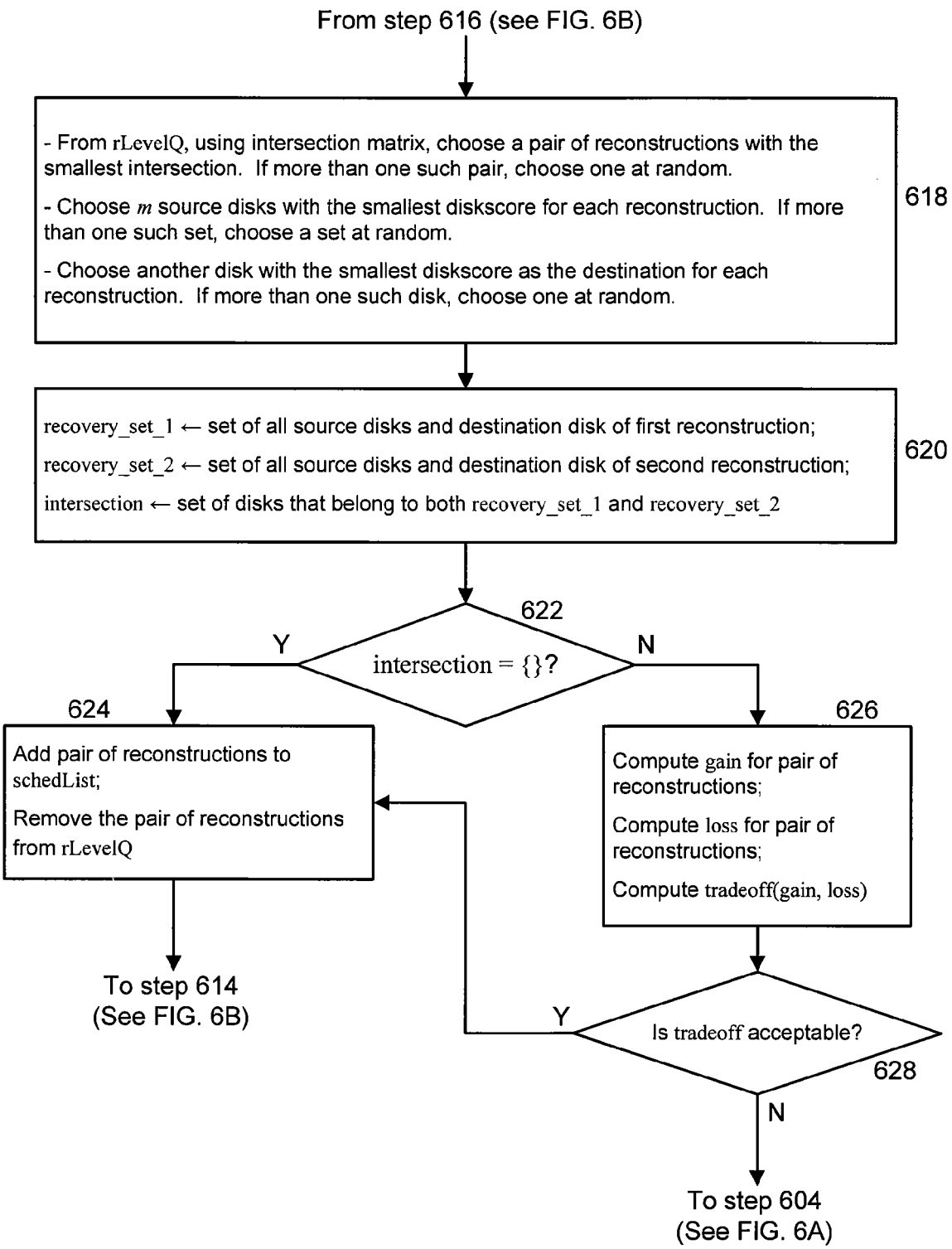

The process then passes to step 622, in which a status check is performed. If intersection is empty, then the process passes to step 624, in which the pair of reconstructions is added to schedList, and the pair of reconstructions is removed from rLevelQ. The process then returns to step 614 (FIG. 6B). If intersection is not empty, then the processes passes to step 626, in which values of gain, loss, and tradeoff for the pair of reconstructions are computed (as discussed above). The process then passes to step 628, in which a status check is performed. If the value of tradeoff is acceptable, then the process passes to step 624 and then returns to step 614 (FIG. 6B). If the value of the tradeoff is not acceptable, then the process returns to step 604 (FIG. 6A).

Figure 6D:
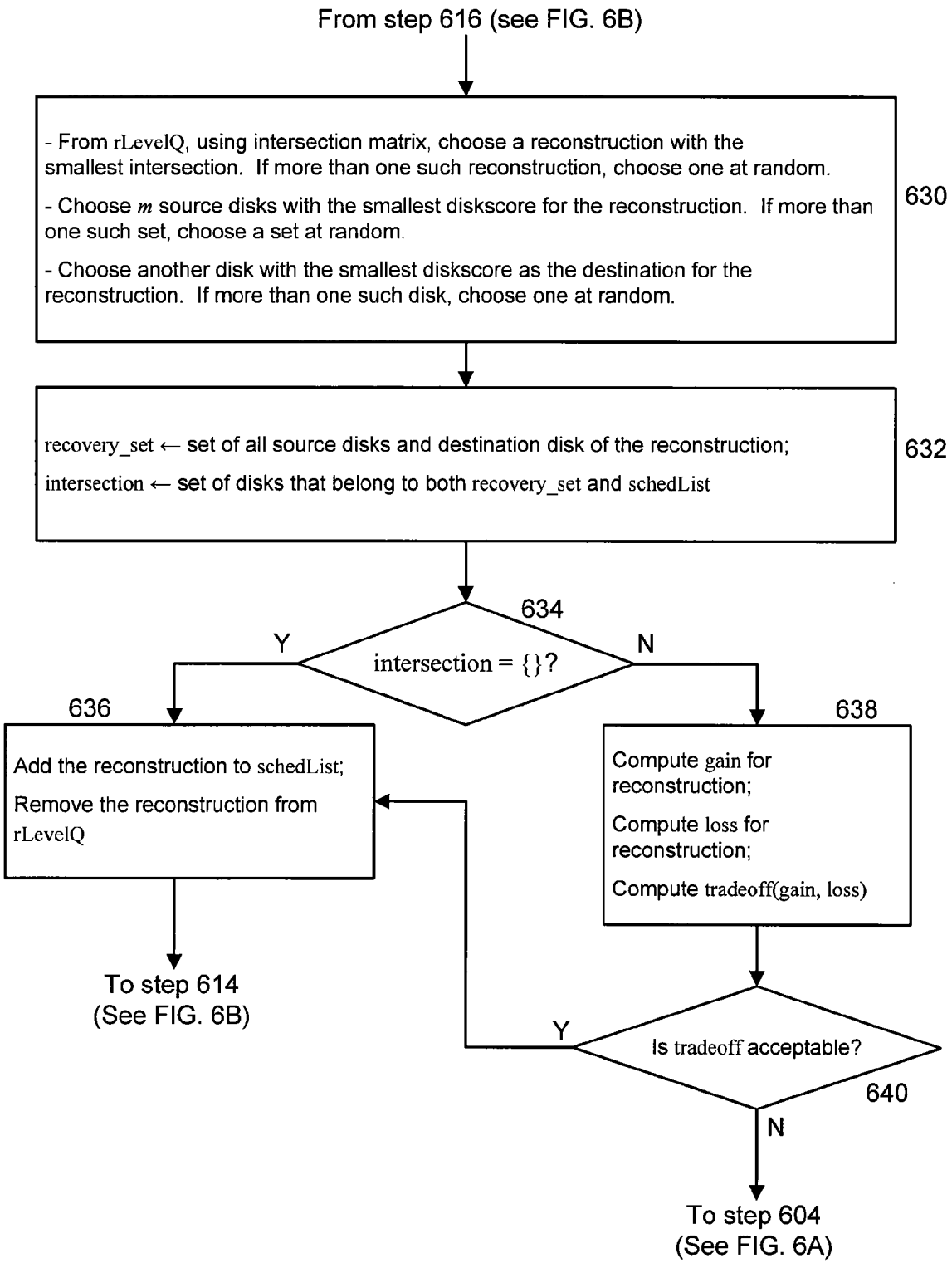

Referring back to step 616 in FIG. 6B, if schedList is not empty, then the process passes to step 630 (see FIG. 6D). In step 630, the following processes are performed: (a) From rLevelQ, using the intersection matrix, choose a reconstruction with the smallest intersection. If more than one such reconstruction exists, choose one at random. (b) Choose m source disks with the smallest diskscore for the reconstruction. If more than one such set of source disks exists, choose a set at random. (c) Choose another disk with the smallest diskscore as the destination for the reconstruction. If more than one such disk exists, choose one at random. The process then passes to step 632, in which the following parameters are set: (a) recovery_set is the set of all source disks and the destination disk of the reconstruction. (b) intersection is the set of disks that belong to both recovery_set and schedList.

The process then passes to step 634, in which a status check is performed. If intersection is empty, then the process passes to step 636, in which the reconstruction is added to schedList, and the reconstruction is removed from rLevelQ. The process then returns to step 614 (FIG. 6B). If intersection is not empty, then the process passes to step 638, in which values of gain, loss, and tradeoff are computed for the reconstruction. The process then passes to step 640, in which a status check is performed. If the value of tradeoff is acceptable, then the process passes to step 636 and then returns to step 614 (FIG. 6B). If the value of the tradeoff is not acceptable, then the process returns to step 604 (FIG. 6A).

Embodiments of the invention may be implemented with a computer, shown schematically in FIG. 1 as recovery manager 106, which communicates with distributed data storage system 104 via data network 102. The MinI policy is activated by recovery manager 106 whenever there are reconstructions to be performed. In an embodiment of the invention, the recovery manager 106 keeps track of the required reconstructions by querying each data storage unit (such as data storage unit 1 120, data storage unit 2 130, and data storage unit 3 140) about any failed disks, their contents, and the potential sources for each fragment reconstruction. In other embodiments of the invention, the data storage units may autonomously transmit information (such as status and fault alarms) to the recovery manager 106. The recovery manager 106 immediately schedules reconstructions concurrently according to the output of MinI. When these reconstructions complete, the recovery manager 106 calls MinI again, until all reconstructions have been performed. Again, by interacting with the data storage units, the manager finds out about disk replacements. After any of these reliability events (failures, reconstructions, and replacements), the recovery manager 106 computes the NDS of the system using the models discussed above.

Figure 7:
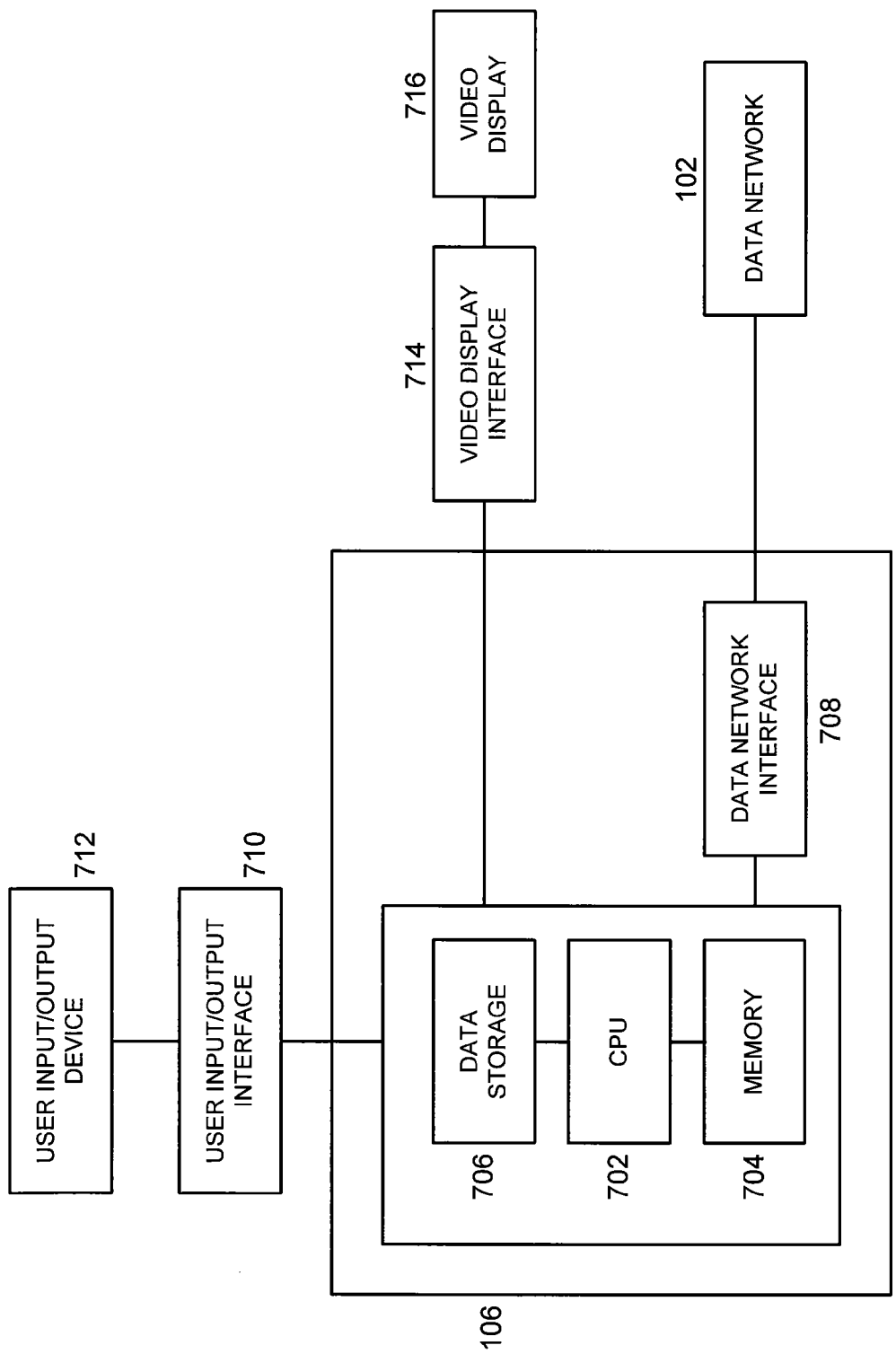
FIG. 7 shows a high-level schematic of a computer.

FIG. 7 shows a high-level schematic of an embodiment of recovery manager 106, which may be any type of well-known computer comprising a central processing unit CPU 702, memory 704, data storage device 706, and data network interface 708. Data storage device 706 comprises a hard drive, non-volatile memory, or other computer readable medium (such as a compact disc read only memory). Data network interface 708 connects recovery manager 106 to data network 102. Recovery manager 106 may further connect to a user input/output device 712 (such as a keyboard or mouse) via user input/output interface 710 and to a video display 716 via video display interface 714.

As is well known, a computer operates under control of computer software which defines the overall operation of the computer and applications. CPU 702 controls the overall operation of the computer and applications by executing computer program instructions which define the overall operation and applications. The computer program instructions may be stored in data storage device 706 and loaded into memory 704 when execution of the program instructions is desired. The method steps of FIG. 5 and FIGS. 6A-6D may be defined by the computer program instructions stored in the memory 704 or in the data storage device 706 (or in a combination of memory 704 and data storage device 706) and controlled by the CPU 702 executing the computer program instructions. For example, the computer program instructions may be implemented as computer executable code programmed by one skilled in the art to perform algorithms implementing the method steps of FIG. 5 and FIGS. 6A-6D. Accordingly, by executing the computer program instructions, the CPU 702 executes algorithms implementing the method steps of FIG. 5 and FIGS. 6A-6D.

One skilled in the art will recognize that an implementation of an actual computer may contain other components as well, and that FIG. 7 is a high-level representation of some of the components of a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for scheduling reconstructions of data stored in a distributed data storage system comprising a plurality of disks, the method comprising the steps of:

receiving a set of reconstructions;

dividing the set of reconstructions into a set of queues rank-ordered by redundancy level ranging from a lowest redundancy level to a highest redundancy level;

calculating a first intersection matrix for reconstructions in a first queue, the first queue having the lowest redundancy level;

calculating a first Normalcy Deviation Score;

calculating a first diskscore for each disk in the plurality of disks;

generating a first schedule for the received set of reconstructions based at least in part on the first intersection matrix, the first Normalcy Deviation Score, and the first diskscores, wherein the data is organized into blocks, and wherein the step of calculating a Normalcy Deviation Score comprises the step of calculating a Normalcy Deviation Score according to the algorithm:

$$NDS(t) = \left(\sum_{i=0}^{k-1} b_i(t) \times f^{k-i}\right) \times T_{alloc},$$

wherein:
NDS(t) is the Normalcy Deviation Score at time t;
k is the level of redundancy of all blocks in the distributed data storage system under normal operation;
$b_i$ is the number of blocks that have i levels of redundancy left at time t;
$T_{alloc}$ is the minimum time to reconstruct a disk; and
is a user-defined scaling factor.

2. The method of claim 1, further comprising the steps of:
calculating a first gain value based at least in part on the first Normalcy Deviation Score;
calculating a first performance loss value;
calculating a first tradeoff value based at least in part on the calculated first gain value and the calculated first performance loss; and
generating the first schedule based at least in part on the calculated first tradeoff value.

3. The method of claim 2, further comprising the step of:
increasing recovery bandwidth if the calculated first tradeoff value is greater than a user-defined value.

4. The method of claim 1, wherein the intersection matrix for each specific queue in the set of queues contains the size of a pairwise intersection of potential source disks for the reconstructions in the specific queue.

5. The method of claim 1, wherein the diskscore comprises a static score and a dynamic score.

6. The method of claim 1, further comprising the steps of:
calculating a second intersection matrix for reconstructions in a second queue, the second queue having the second lowest redundancy level;
calculating a second Normalcy Deviation Score;
calculating a second diskscore for each disk in the plurality of disks; and
generating a second schedule for the received set of reconstructions based at least in part on the first intersection matrix, the first Normalcy Deviation Score, the first diskscores, the second intersection matrix, the second Normalcy Deviation Score, and the second diskscores.

7. The method of claim 6, further comprising the steps of:
calculating a second gain value based at least in part on the second Normalcy Deviation Score;
calculating a second performance loss value;
calculating a second tradeoff value based at least in part on the calculated second gain value and the calculated second performance loss; and
generating the second schedule based at least in part on the calculated second tradeoff value.

8. The method of claim 7, further comprising the step of:
increasing recovery bandwidth if the calculated second tradeoff value is greater than or equal to a user-defined value.

9. A computer readable medium storing computer program instructions for scheduling reconstructions of data in a distributed data storage system comprising a plurality of disks, the computer program instructions defining the steps of:
receiving a set of reconstructions;
dividing the set of reconstructions into a set of queues rank-ordered by redundancy level ranging from a lowest redundancy level to a highest redundancy level;

calculating a first intersection matrix for reconstructions in a first queue, the first queue having the lowest redundancy level;
calculating a first Normalcy Deviation Score;
calculating a first diskscore for each disk in the plurality of disks;
generating a first schedule for the received set of reconstructions based at least in part on the first intersection matrix, the first Normalcy Deviation Score, and the first diskscores, wherein the data is organized into blocks, and wherein the computer program instructions defining the step of calculating a Normalcy Deviation Score comprises the step of calculating a Normalcy Deviation Score according to the algorithm:

$$NDS(t) = \left(\sum_{i=0}^{k-1} b_i(t) \times f^{k-i}\right) \times T_{alloc},$$

wherein:
NDS(t) is the Normalcy Deviation Score at time t;
k is the level of redundancy of all blocks in the distributed data storage system under normal operation;
$b_i$ is the number of blocks that have i levels of redundancy left at time t;
$T_{alloc}$ is the minimum time to reconstruct a disk; and
f is a user-defined scaling factor.

10. The computer readable medium of claim 9, wherein the computer program instructions for scheduling reconstructions of data further comprise computer program instructions defining the steps of:
calculating a first gain value based at least in part on the first Normalcy Deviation Score;
calculating a first performance loss value;
calculating a first tradeoff value based at least in part on the calculated first gain value and the calculated first performance loss; and
generating the first schedule based at least in part on the calculated first tradeoff value.

11. The computer readable medium of claim 9, wherein the computer program instructions for scheduling reconstructions of data further comprise computer program instructions defining the step of:
increasing recovery bandwidth if the calculated first tradeoff value is greater than a user-defined value.

12. The computer readable medium of claim 9, wherein the intersection matrix for each specific queue in the set of queues contains the size of a pairwise intersection of potential source disks for the reconstructions in the specific queue.

13. The computer readable medium of claim 9, wherein the diskscore comprises a static score and a dynamic score.

14. The computer readable medium of claim 9, wherein the computer program instructions for scheduling reconstructions of data further comprise computer program instructions defining the steps of:
calculating a second intersection matrix for reconstructions in a second queue, the second queue having the second lowest redundancy level;
calculating a second Normalcy Deviation Score;
calculating a second diskscore for each disk in the plurality of disks; and
generating a second schedule for the received set of reconstructions based at least in part on the first intersection matrix, the first Normalcy Deviation Score, the first diskscores, the second intersection matrix, the second Normalcy Deviation Score, and the second diskscores.

15. The computer readable medium of claim 14, wherein the computer program instructions for scheduling reconstructions of data further comprise computer program instructions defining the steps of:
calculating a second gain value based at least in part on the second Normalcy Deviation Score;
calculating a second performance loss value;
calculating a second tradeoff value based at least in part on the calculated second gain value and the calculated second performance loss; and
generating the second schedule based at least in part on the calculated second tradeoff value.

16. The computer readable medium of claim 15, wherein the computer program instructions for scheduling reconstructions of data further comprise computer program instructions defining the step of:
increasing recovery bandwidth if the calculated second tradeoff value is greater than a user-defined value.

* * * * *